(12) United States Patent
Nakatani

(10) Patent No.: US 8,305,291 B2
(45) Date of Patent: Nov. 6, 2012

(54) TIRE-STATE DETECTION DEVICE

(75) Inventor: Koji Nakatani, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/393,132

(22) PCT Filed: May 18, 2010

(86) PCT No.: PCT/JP2010/058351
§ 371 (c)(1),
(2), (4) Date: Feb. 28, 2012

(87) PCT Pub. No.: WO2011/027595
PCT Pub. Date: Mar. 10, 2011

(65) Prior Publication Data
US 2012/0154242 A1 Jun. 21, 2012

(30) Foreign Application Priority Data
Sep. 1, 2009 (JP) ................................. 2009-201574

(51) Int. Cl.
*H01Q 1/36* (2006.01)
(52) U.S. Cl. .......................... 343/895; 343/848; 340/447
(58) Field of Classification Search .................. 343/848, 343/895; 73/246; 340/442, 447
See application file for complete search history.

(56) References Cited

U.S. PATENT DOCUMENTS

| 6,899,153 B1 * | 5/2005 | Pollack et al. ............ 152/152.1 |
| 7,595,721 B2 * | 9/2009 | Shinmura ..................... 340/447 |
| 7,999,663 B2 * | 8/2011 | Mancosu et al. ............. 340/445 |
| 8,051,705 B2 * | 11/2011 | Kobayakawa ................. 73/146 |
| 2006/0006993 A1 | 1/2006 | Katou et al. |
| 2006/0044118 A1 | 3/2006 | Katou et al. |
| 2008/0278306 A1 * | 11/2008 | Uehara et al. ................. 340/447 |
| 2009/0102633 A1 | 4/2009 | Ebinuma et al. |

FOREIGN PATENT DOCUMENTS

| JP | 2004-345485 A | 12/2004 |
| JP | 2005-204133 A | 7/2005 |

(Continued)

OTHER PUBLICATIONS

International Search Report of corresponding International Application No. PCT/JP2010/058351, dated on Aug. 31, 2010.
Office Action of Japanese Patent Application No. 2011-509745, dated Jun. 17, 2011.

*Primary Examiner* — Tan Ho
(74) *Attorney, Agent, or Firm* — Global IP Counselors, LLP

(57) ABSTRACT

A tire-state detection device including a sensor, an antenna having a predetermined frequency, a detection circuit, a case, and a planar conductor. The sensor detects a predetermined physical state of a tire. The detection circuit transmits information regarding a result of a detection made by the sensor from the antenna as radio waves. The case houses the sensor, the antenna and the detection circuit, and allows radio waves to pass. The case fits on a rim in the tire when the tire-state detection device is to be used. The planar conductor is electrically insulated from the antenna at a position set a predetermined distance away from the antenna so as to form an interface between the antenna and the rim when the case is fitted to the rim, and the planar conductor is set to a potential that is equivalent to a reference potential of the detection circuit.

10 Claims, 15 Drawing Sheets

FOREIGN PATENT DOCUMENTS

| | | |
|---|---|---|
| JP | 2005-254900 A | 9/2005 |
| JP | 2006-33047 A | 2/2006 |
| JP | 2006-74369 A | 3/2006 |
| JP | 2006-327460 A | 12/2006 |
| JP | 2009-184412 A | 8/2009 |
| WO | WO-2006/003934 A1 | 1/2006 |

* cited by examiner

TIRE-STATE DETECTION DEVICE

CROSS-REFERENCE TO RELATED APPLICATIONS

This U.S. National stage application claims priority under 35 U.S.C. §119(a) to Japanese Patent Application No. 2009-201574, filed in Japan on Sep. 1, 2009, the entire contents of Japanese Patent Application No. 2009-201574 are hereby incorporated herein by reference.

BACKGROUND

1. Field of the Invention

The present invention relates to a tire-state detection device, and more particularly to a tire-state detection device for transmitting detection results using radio signals to an external destination, the device used by being fitted to a rim inside a tire.

2. Background Information

Generally, a tire-state detection device that is equipped with a wireless device for transmitting air-pressure data is fitted to a rim well in a system for monitoring air pressure inside a tire as described in Japanese Unexamined Patent Publication 2006-327460. Characteristics often greatly fluctuate because an antenna equipped in the tire-state detection device is affected by nearby metallic parts, such as the rim. Therefore, antenna designs have been required for providing tire-state detection devices on metallic parts, such as the rim and the like. However, rim shapes are varied, and the resonance frequency and impedance of the antenna fluctuate dramatically if the distance between the antenna and the metal constituting the rim are different due to the shape of the rim.

For example, if a tire-state detection device that is equipped with a transmitter capable of a transmitting frequency of 315 MHz, and an antenna having a resonance frequency of 315 MHz is optimally fitted in the rim, a good impedance characteristic will be obtained, as shown in FIG. 26. However, if the tire-state detection device is fitted slightly away from the rim, or is fitted on a rim having a different shape, antenna resonance frequency will shift dramatically, as shown in FIG. 27.

SUMMARY

Because the resonance frequency of an antenna in a tire-state detection device often shifts dramatically if the rim has different shapes where the tire-state detection device is installed, as well as for other reasons, it has been necessary to design antennas for individual shapes in order to maintain good antenna characteristics.

Therefore, it has been necessary to create antennas provided with the optimum characteristic for each rim shape. For that reason, manufacturing costs associated with each antenna has increased, and mass production has been difficult.

In view of the aforementioned problems, an object of the present invention is to provide a tire-state detection device that can attain good antenna characteristics even if the shape of the rim is different where the device is fitted, that reduces manufacturing costs, and that can be mass produced.

In order to attain the aforementioned object, the tire-state detection device of the present invention comprises a sensor for detecting a predetermined physical state of a tire; an antenna having a predetermined resonance frequency; a detection circuit for transmitting information regarding a result of a detection made by the sensor from the antenna as radio waves; and a case for housing the sensor, the antenna and the detection circuit, and for allowing radio waves to pass therethrough, the case being fitted on a rim in the tire when the tire-state detection device is to be used wherein the tire-state detection device is characterized in that there is provided a planar conductor secured in a state of being electrically insulated from the antenna at a position set a predetermined distance away from the antenna so as to form an interface between the antenna and the rim when the case is fitted to the rim, and set to a potential that is equivalent to a reference potential of the detection circuit.

According to the present invention, a planar conductor set to a reference potential of the detection circuit is disposed in the device at a position set a predetermined distance from the antenna. When the device is fitted to the rim, the planar conductor becomes an interface between the antenna and the rim. For that reason, it is possible dramatically to reduce any effect that the metal constituting the rim has on the antenna compared to conventional devices According to the tire-state detection device of the present invention, when the tire-state detection device is fitted to a rim, the case is secured to the rim surface so that the bottom surface of the case faces the rim surface. By securing the case to the rim in this way, the planar conductor that is set to a reference potential is disposed between the antenna and rim surface, allowing the planar conductor to be an interface between the antenna and the rim when the tire-state detection device is fitted to the rim. For that reason, it is possible to dramatically reduce the effect that the metal constituting the rim has on the antenna compared to conventional devices. Therefore, it is not necessary to create an antenna that is equipped with optimum characteristics for each rim shape. Furthermore, it is possible to use the same antenna with any rim shape, which greatly reduces the manufacturing cost associated with each tire-state detection device compared to conventional devices, and the tire-state detection device can easily be mass produced.

DETAILED DESCRIPTION OF EMBODIMENTS

Figure 1:
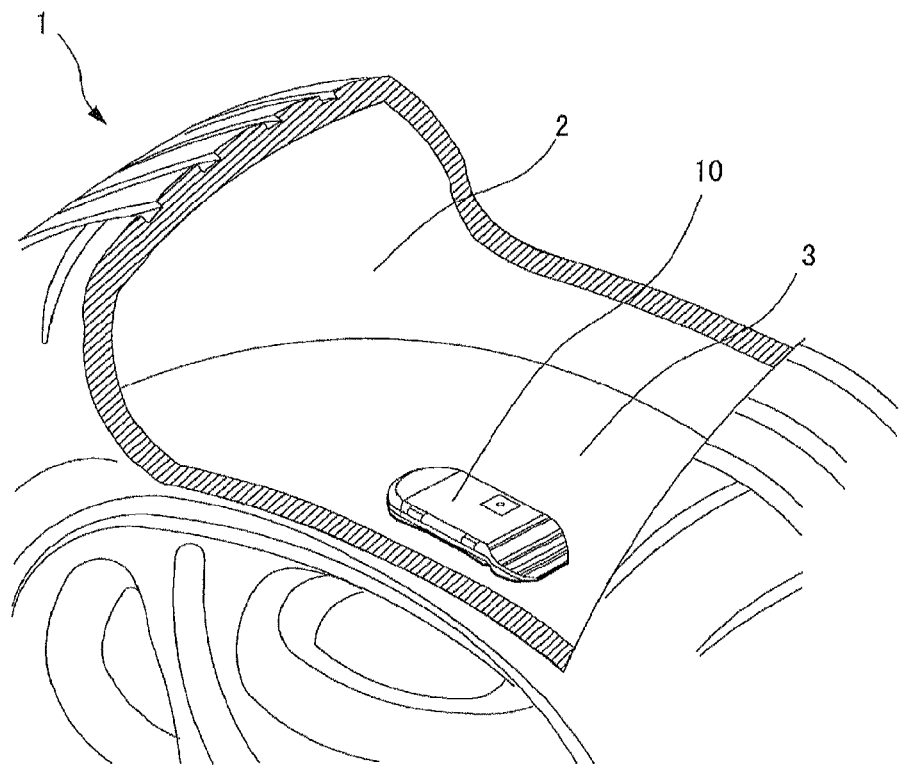
FIG. 1 is a view of a tire fitted with a tire-state detection device according to a first embodiment of the present invention.
Figure 2:
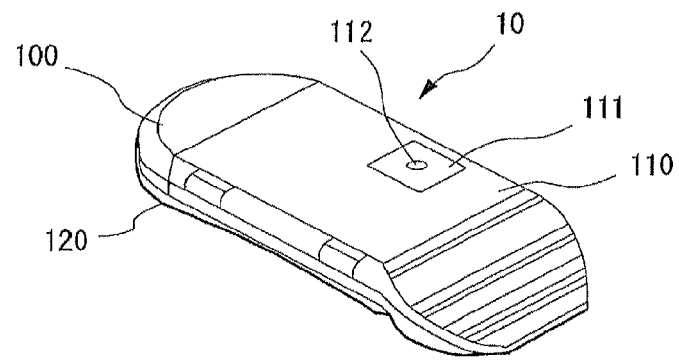
FIG. 2 is an external view of the tire-state detection device according to the first embodiment of the present invention.
Figure 3:
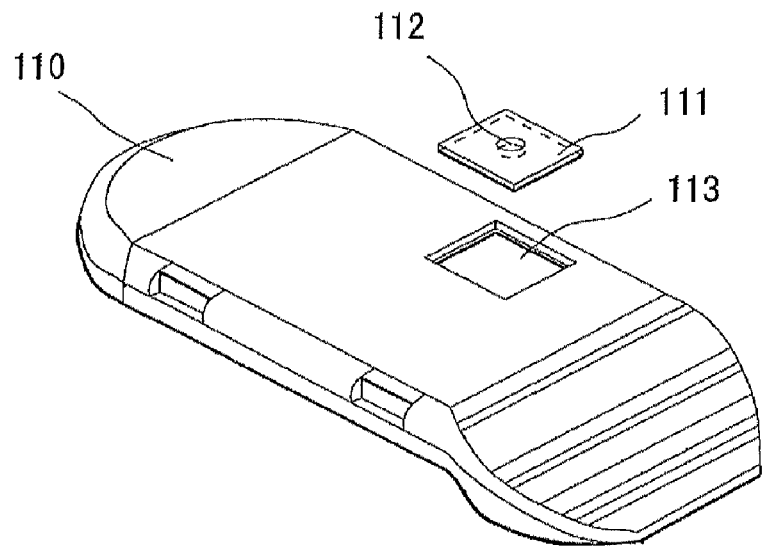
FIG. 3 is an exploded perspective view of the tire-state detection device according to the first embodiment of the present invention.
Figure 3:
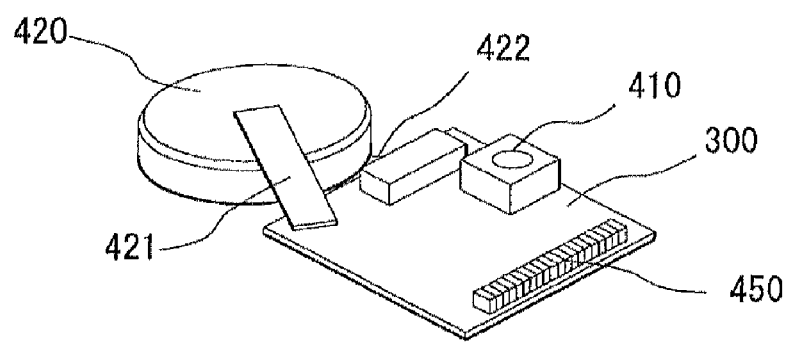
Figure 3:
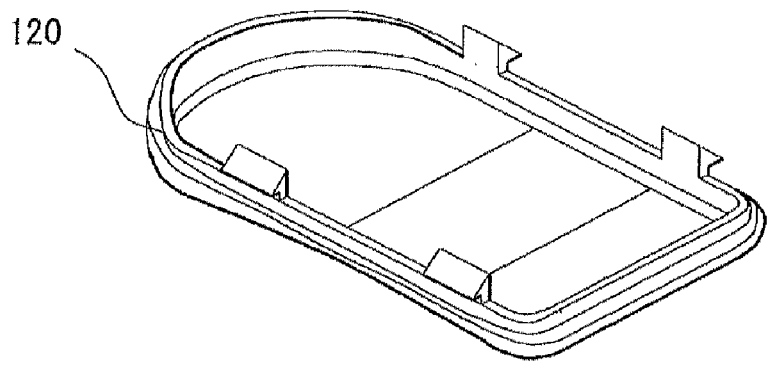
Figure 4:
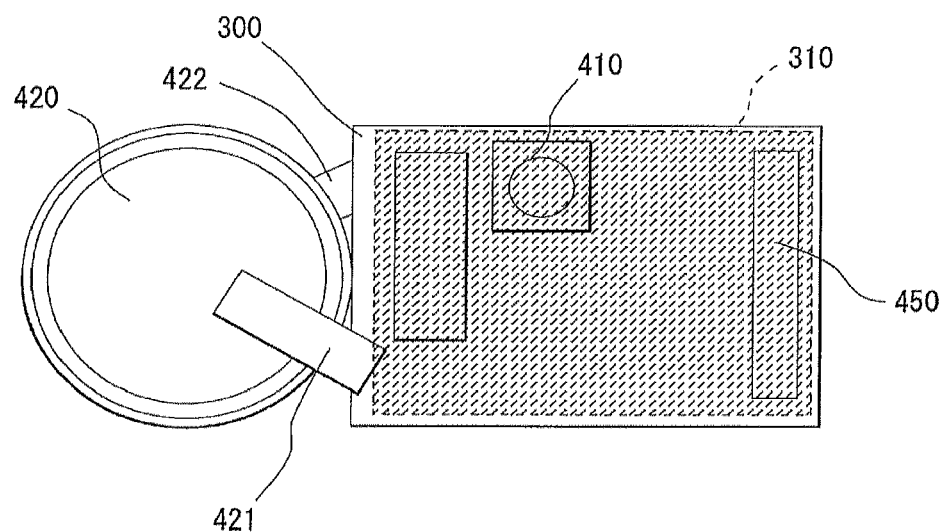
FIG. 4 is a plan view of a printed wiring board according to the first embodiment of the present invention.
Figure 5:
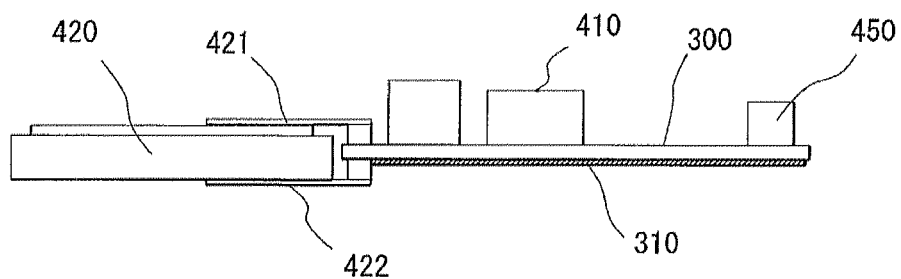
FIG. 5 is a side view of the printed wiring board according to the first embodiment of the present invention.
Figure 6:
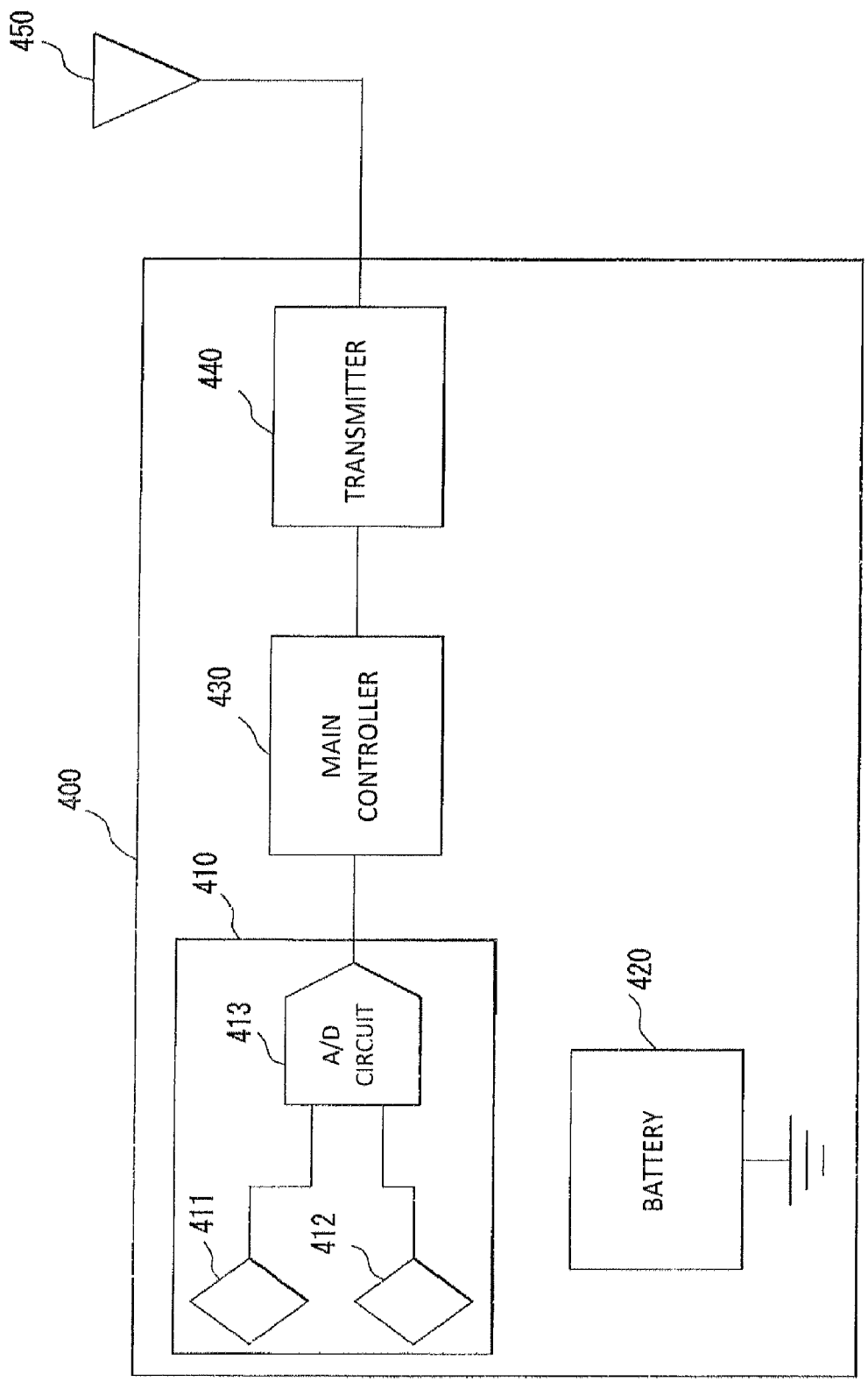
FIG. 6 is a block diagram of an electrical circuit in the tire-state detection device according to the first embodiment of the present invention.

Embodiments of the present invention will now be described with reference to the drawings provided FIG. 1 is a view of a tire fitted with a tire-state detection device according to a first embodiment of the present invention; FIG. 2 is an external view of the tire-state detection device according to the first embodiment of the present invention; FIG. 3 is an exploded perspective view of the tire-state detection device according to the first embodiment of the present invention; FIG. 4 is a plan view of a printed wiring board according to the first embodiment of the present invention; FIG. 5 is a side view of the printed wiring board according to the first embodiment of the present invention; and FIG. 6 is a block diagram of an electrical circuit in the tire-state detection device according to the first embodiment of the present invention.

A tire-state detection device 10 is secured at a predetermined position on a rim 3 in an air chamber 2 of a tire 1. A sensor equipped with a pressure detection element and a temperature detection element, described below, installed in the tire-state detection device 10 detects air pressure and temperature in the air chamber 2 of the tire 1. The detection results are converted to digital values. The tire-state detection device 10 sends this data by generating digital information that includes these digital values. In addition to the digital values of the detection results, identification information that is unique to the tire-state detection device 10 is included in the digital information.

The tire-state detection device 10 is equipped with a case 100; a printed wiring board 300 and a battery 420 are housed in the case 100. A detection circuit 400, shown in FIG. 6, is formed on the printed wiring board 300. Specifically, the detection circuit 400 is composed of a sensor 410, a battery 420, a main controller 430, a transmitter 440, and an antenna 450.

The case 100 is composed of a case body 120 formed by a synthetic resin that allows radio waves to pass therethrough, and a top cover 110. A rectangular opening 113 is formed in a position that faces the sensor 410 position, at a predetermined position in the cover 110; the opening 113 is covered by cover body 111 that has a ventilation hole 112.

The sensor 410 is disposed on a top surface of the printed wiring board 300 and is composed of an air pressure detection element 411, a temperature detection element 412, and an A/D conversion circuit 413. The air pressure detection element 411 and the temperature detection element 412 detect the air pressure and temperature inside the air chamber 2 in the tire 1, respectively. The A/D conversion circuit 413 converts the detection results into digital values and outputs that to the main controller 430.

A battery 420 is connected to the printed wiring board 300 by connecting conductors 421, 422, to supply power to the detection circuit 400 that is formed on the printed wiring board 300. One connecting conductor 421 is connected to a positive electrode of the battery 420 and to a top surface of the printed wiring board 300; the other connecting conductor 422 is connected to a negative electrode of the battery 420, and to a back surface of the printed wiring board 300. The potential of the negative electrode on the battery 420 in the detection circuit 400 is a reference potential (=0 V).

The main controller 430 is composed of a known CPU and memory; it receives detection results of the sensor 430 as digital values, and outputs them to the transmitter 440 by generating digital information that includes these digital values. In addition to the digital values of the detection results, identification information that is unique to the tire-state detection device 10, such as its serial number, is included in the digital information.

The transmitter 440 uses radio waves of a predetermined frequency, such as 315 MHz, to send digital information input from the main controller 430.

The antenna 450 is a helical antenna whose resonance frequency is set to the transmitting frequency of the transmitter 440. The antenna 450 is fitted on the top face of the printed wiring board 300. Furthermore, the antenna 450 is fitted to the top face of the printed wiring board 300 so that an axis of the helical antenna is parallel to the top surface of the printed wiring board 300.

The printed wiring board 300 is composed of a stacked, multi-layer ceramic substrate. A conductor pattern 310 is disposed over substantially the entire back face of the printed wiring board 300. The conductor pattern 310 is connected to the negative electrode of the battery 420; its potential is set to the reference potential (=0 V) of the detection circuit 400. The back face of the printed wiring board 300 is secured on the case body 120 so that the back face, specifically the conductor pattern 310, faces the bottom face of the case body 120.

Generally, the thickness of copper foil that forms the conductor pattern 310 is 12, 18, 35, or 70 microns (μm) and the like. However, the thickness of the conductor pattern 310 is preferred to be 18 μm or higher, in consideration of durability (strength to resist peeling).

Figure 7:
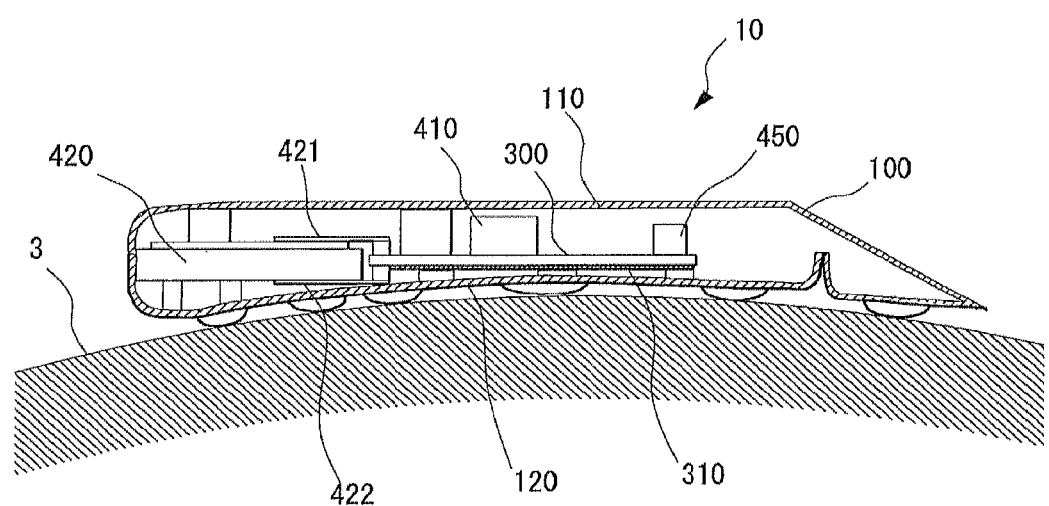
FIG. 7 is a lateral sectional view of the tire-state detection device fitted to a rim, according to the first embodiment of the present invention.

FIG. 7 shows a lateral sectional view of the tire-state detection device 10 configured as described above, fitted to the rim 3. As shown in the drawing, when the tire-state detection device 10 is fitted to the rim 3, the case 100 is secured to the rim 3 top face so that the bottom surface of the case body 120 faces the rim 3 surface. By securing the case 100 to the rim 3 in this way, the conductor pattern 310 that is set to a reference potential is disposed between the antenna 450 fitted on the top face of the printed wiring board 300, and the rim 3. For that reason, the conductor pattern 310 (planar conductor) becomes an interface between the antenna 450 and the rim 3 when the tire-state detection device 10 is fitted to the rim. For that reason, it is possible to dramatically reduce the effect that the metal constituting the rim 3 has on the antenna 450 compared to conventional devices. Furthermore, a constant distance is maintained between the antenna 450 and conductor pattern 310 because of the thickness of the dielectric body of the printed wiring board 300; therefore, good antenna characteristics can be maintained even if the rim 3 shape is changed.

Therefore, it is not necessary to create an antenna 450 that is provided with optimum characteristics for each shape of the rim 3, and it is possible to use the same antenna 450 with any shape of the rim 3; therefore, the manufacturing cost associated with each tire-state detection device 10 can be greatly reduced compared to conventional devices, and the tire-state detection device 10 can easily be mass produced.

Next, a second embodiment of the present invention will be explained.

Figure 8:
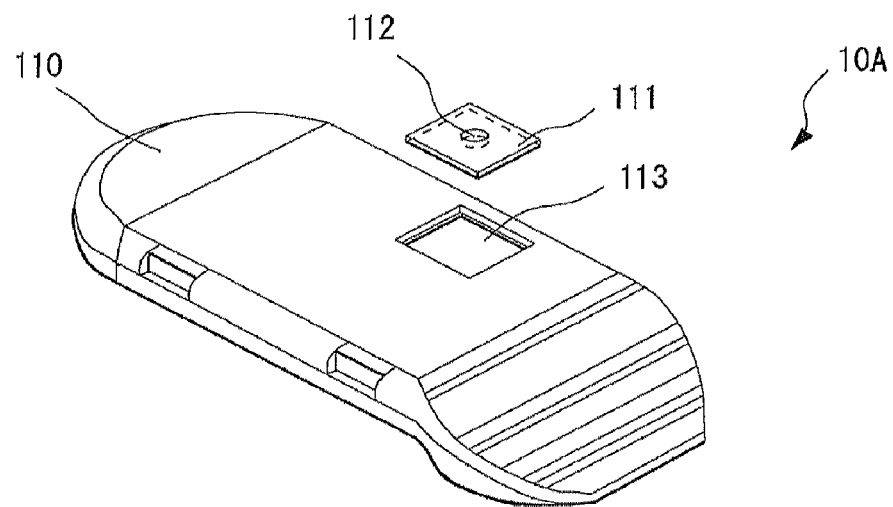
FIG. 8 is an exploded perspective view of the tire-state detection device according to a second embodiment of the present invention.
Figure 8:
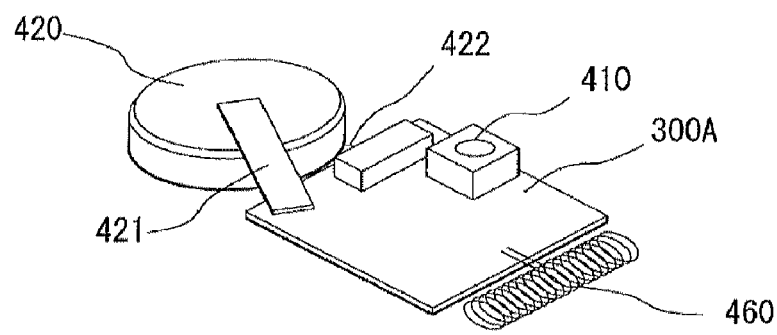
Figure 8:
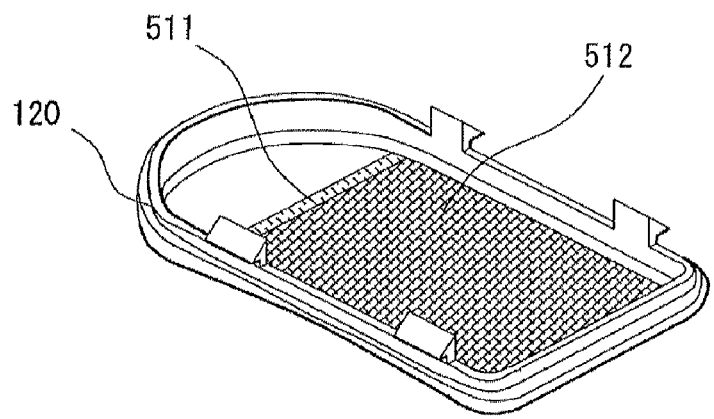
Figure 9:
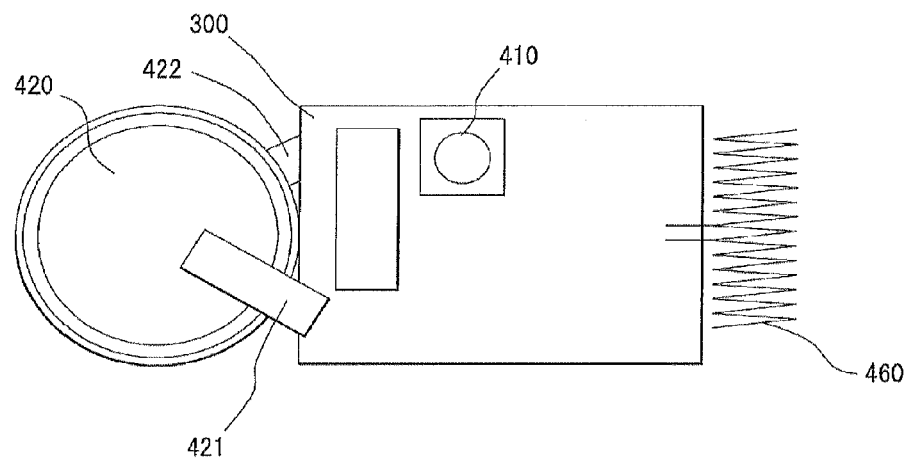
FIG. 9 is a plan view of a printed wiring board according to the second embodiment of the present invention.
Figure 10:
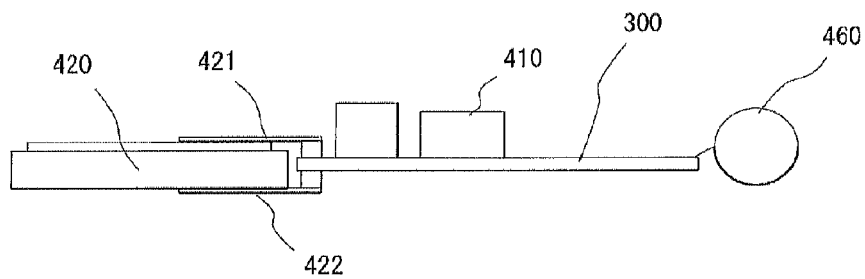
FIG. 10 is a side view of the printed wiring board according to the second embodiment of the present invention.
Figure 11:
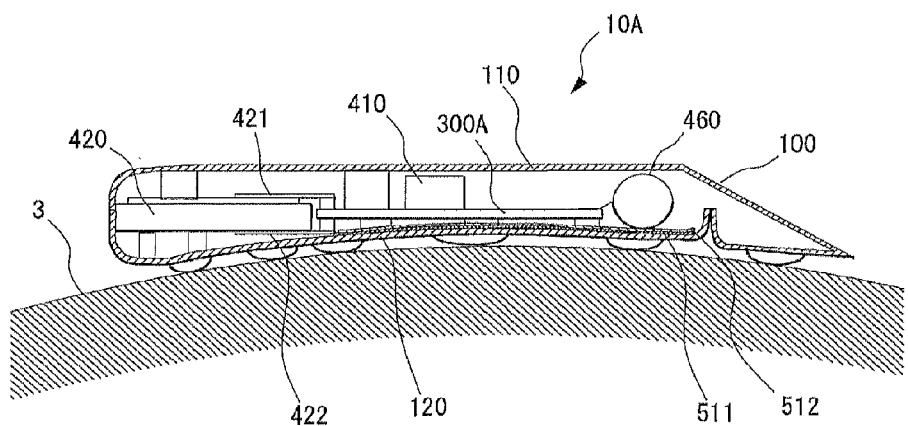
FIG. 11 is a lateral sectional view of the tire-state detection device of the second embodiment of the present invention fitted to a rim.

FIG. 8 is an exploded perspective view of the tire-state detection device 10A according to the second embodiment of the present invention; FIG. 9 is a plan view of a printed wiring board 300A according to the second embodiment of the present invention; FIG. 10 is a side view of the printed wiring board 300A according to the second embodiment of the present invention; and FIG. 11 is a lateral sectional view of the tire-state detection device 10A according to the second embodiment of the present invention fitted to the rim 3. The same symbols are used for the same components described in relation to the first embodiment. Therefore, explanations of those symbols will be omitted. Also, points of difference between the first and the second embodiments are that a coil-shaped antenna 460 is disposed instead of the antenna 450 of the first embodiment, that a printed wiring board 300A is used instead of the printed wiring board 300a, and that a conductor film 511 and an insulating film 512 are disposed at a bottom surface inside the case body 120.

This antenna 460 has a spring-coil shape, whose resonance frequency is set to 315 MHz. A power supply point is disposed at a center thereof. This power supply point is connected to the transmitter 440 that is formed on the printed wiring board 300A. The coil diameter of the antenna 460 is larger than that of the antenna 450. Therefore, it is disposed outside of the periphery of the printed wiring board 300A so that the coil axis of the antenna 460 is parallel with a side and the top surface of the nearby printed wiring board 300A.

The conductor pattern 310 disposed on the back face of the printed wiring board 300 in the first embodiment has been eliminated from the printed wiring board 300A. Therefore, the printed wiring board 300A is the same as the printed wiring board 300, except that the conductor pattern 310 has been eliminated.

As shown in the drawing, a conductor film 511 is disposed on a bottom face and an electrically insulating film 512 is disposed on a top face of the conductor film 511, inside the case body 120. This insulating film 512 prevents a conductive connection between the conductor film 511, the printed wiring board 300A and the antenna 460. Also, the conductor film 511 is electrically connected to the negative electrode on the battery 420; the electric potential of the conductor film 511 is set to the reference potential (=0 V) of the detection circuit 400. Furthermore, the thickness of the conductor film 511 is preferred to be 18 μm or thicker for the same reason described above.

As shown in FIG. 11, when the tire-state detection device 10A configured as described above, is fitted to the rim 3, the case 100 is secured to the top surface of the rim 3 so that the bottom surface of the case body 120 faces the rim 3 surface. By securing the case 100 to the rim 3 in this way, the conductor film 511 that is set to the reference potential is disposed between the antenna 460 and top surface of the rim 3. For that reason, the conductor film 511 (planar conductor) becomes an interface between the antenna 460 and the rim 3 when the tire-state detection device 10A is fitted to the rim 3. Therefore, it is possible dramatically to reduce the effect that the metal constituting the rim 3 has on the antenna 460 compared to conventional devices. Furthermore, a constant distance is maintained between the antenna 460 and conductor pattern 511 because the printed wiring board 300A is secured to a predetermined position on the case body 120. Therefore, good antenna characteristics can be maintained even if the rim 3 shape is changed.

Therefore, it is not necessary to create an antenna 460 provided with optimum characteristics for each shape of the rim 3, and it is possible to use the same antenna 460 with any shape of the rim 3; therefore, the manufacturing cost associated with each tire-state detection device 10A can be greatly reduced compared to conventional devices, and the tire-state detection device 10A can easily be mass produced.

Next, a third embodiment of the present invention will now be explained.

Figure 12:
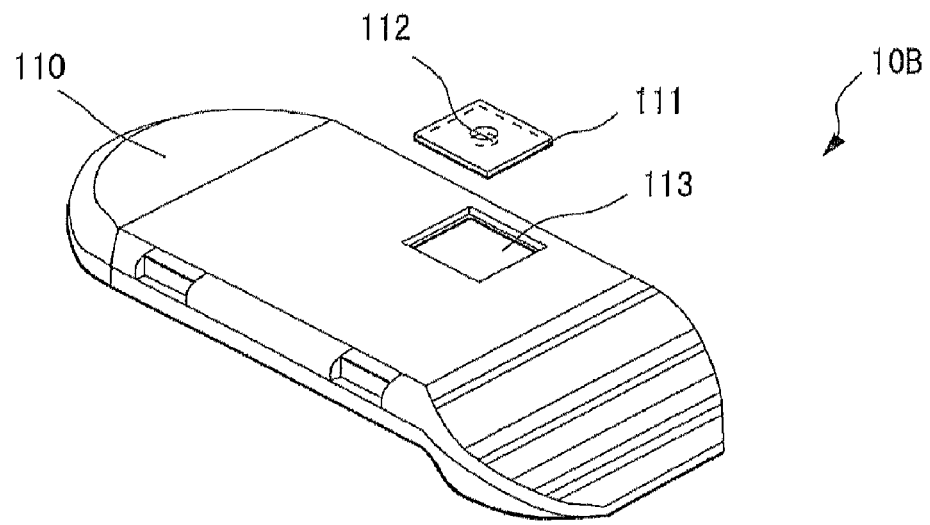
FIG. 12 is an exploded perspective view of the tire-state detection device according to a third embodiment of the present invention.
Figure 12:
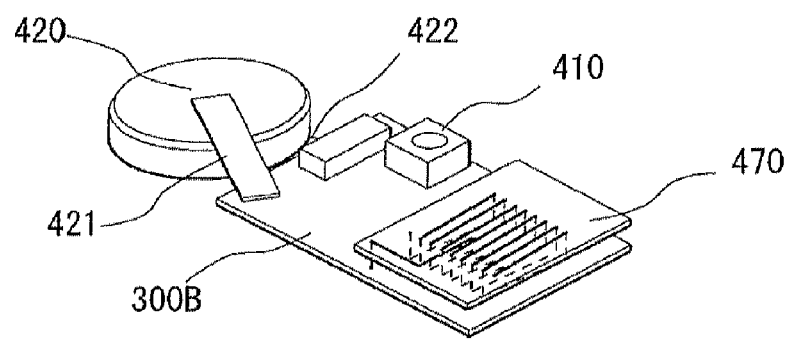
Figure 12:
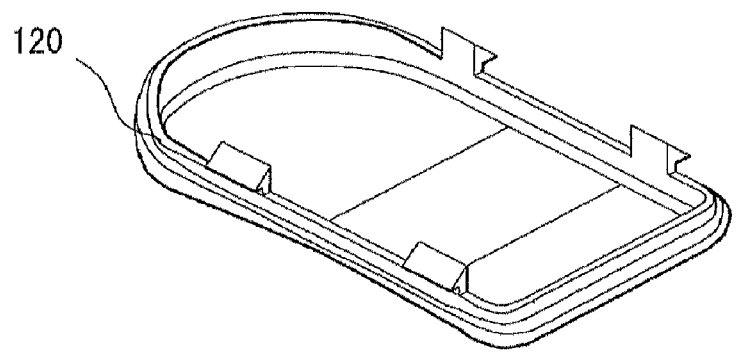
Figure 13:
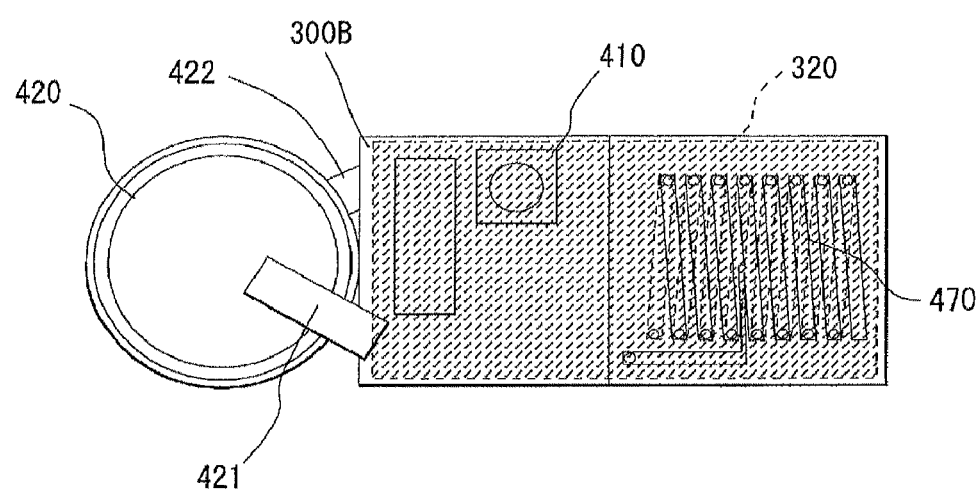
FIG. 13 is a plan view of a printed wiring board according to the third embodiment of the present invention.
Figure 14:
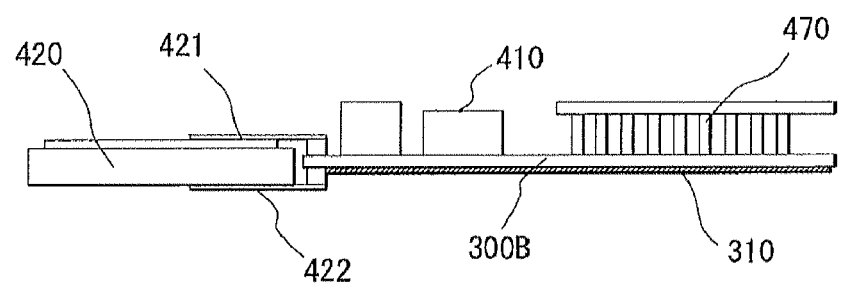
FIG. 14 is a side view of the printed wiring board according to the third embodiment of the present invention.
Figure 15:
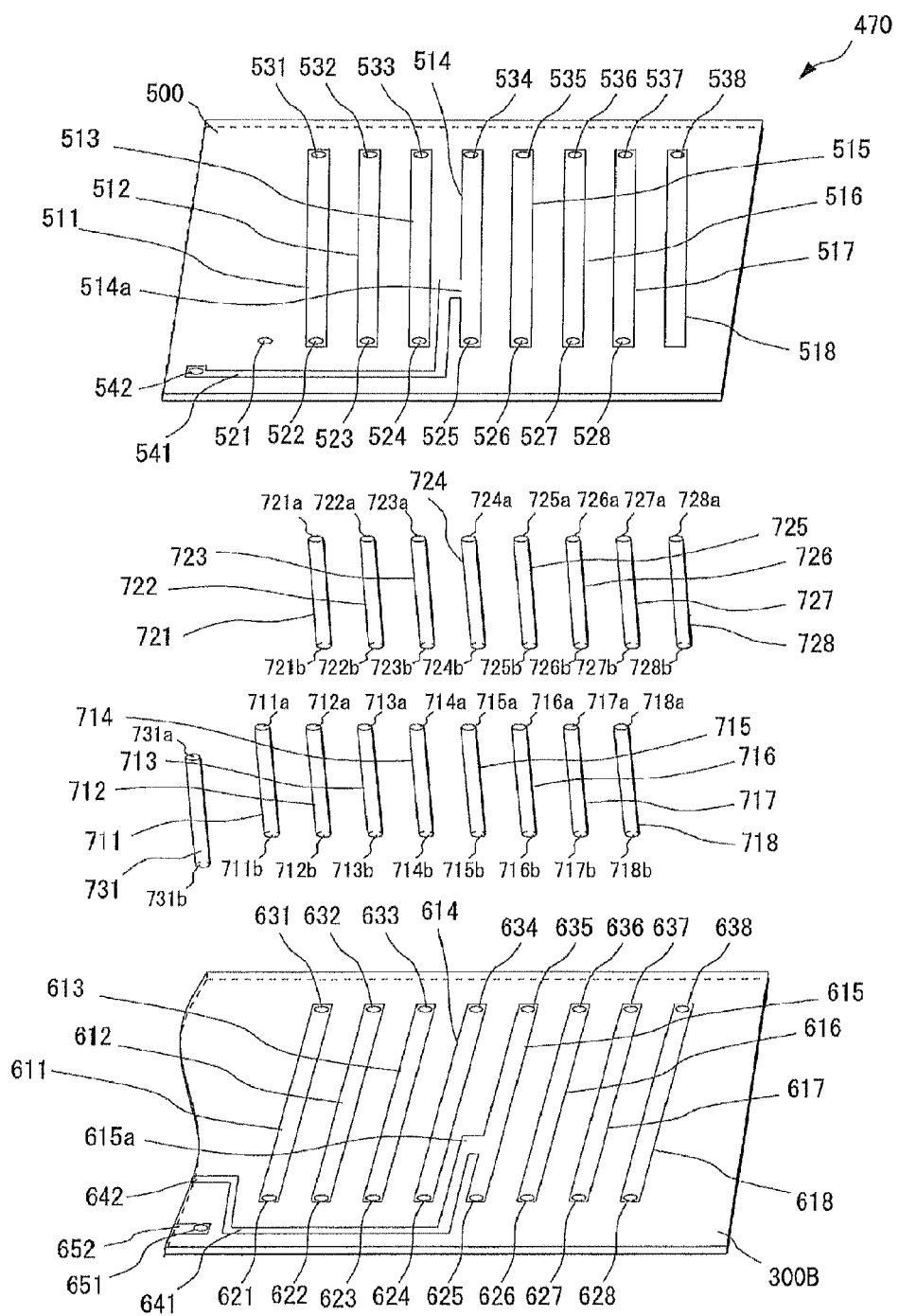
FIG. 15 is an exploded perspective view of an antenna according to the third embodiment of the present invention.
Figure 16:
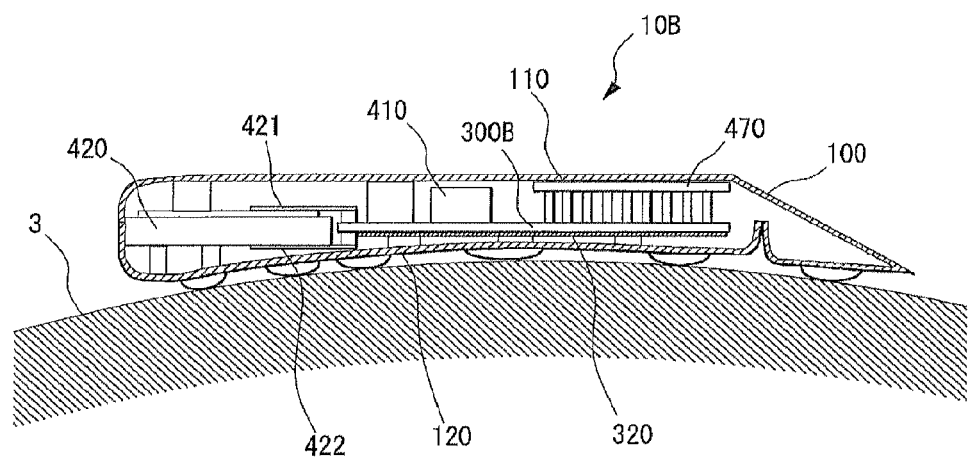
FIG. 16 is a lateral sectional view of the tire-state detection device of the third embodiment of the present invention fitted to a rim.

FIG. 12 is an exploded perspective view of the tire-state detection device 10B according to the third embodiment of the present invention; FIG. 13 is a plan view of a printed wiring board 300B according to the third embodiment of the present invention; FIG. 14 is a side view of the printed wiring board 300B according to the third embodiment of the present invention; FIG. 15 is an exploded, sectional view of an antenna according to the third embodiment of the present invention; and FIG. 16 is a lateral sectional view of the tire-state detection device 10B of the third embodiment of the present invention fitted to a rim. The same symbols are used for the same components described in relation to the first embodiment. Therefore, explanations of those symbols will be omitted. Also, points of difference between the first and the third embodiments are that the antenna 470 is disposed instead of the antenna 450 of the first embodiment, and that the printed wiring board 300B is used instead of the printed wiring board 300.

A widely expanded antenna 470 having a slightly larger shape than the printed wiring board 300A of the first embodiment is formed on the printed wiring board 300B. Also, a conductor pattern 320 that is the same as that described in relation to the first embodiment is disposed over substantially the entire back face of the printed wiring board 300B. The conductor pattern 320 is connected to the negative electrode of the battery 420; the potential of the conductor pattern 320 is set to the reference potential (=0 V) of the detection circuit 400. The thickness of the conductor pattern 320 is preferred to be 18 μm or thicker for the same reason described above.

The antenna 470 is composed of the printed wiring board (hereinafter referred to as a wiring pattern) formed on the printed wiring board 300B, and a printed wiring board 500 connected to the printed wiring board 300B by a plurality of connection conductors.

Specifically, the antenna 470 is composed of printed wiring boards 300B and 500, and cylindrically shaped connection conductors 711 to 718, 721 to 728 and 731. Furthermore, the antenna 470 in this embodiment has the resonance frequency as described above (specifically, 315 MHz).

The printed wiring board 500 is composed of a dielectric substrate having a rectangular shape with a predetermined surface area, and a predetermined thickness. Pluralities of through-holes 521 to 528, and 531 to 538 are disposed along both sides in the width direction, at predetermined spaces in a straight line parallel to the long sides. Also, As shown in FIG. 15, other through-holes 531 to 538 are disposed at positions to face substantially central positions in the spaces between the through-holes 521 to 528 disposed on the other side edge.

Furthermore, a plurality of linear printed wiring patterns (hereinafter referred to as wiring patterns) 511 to 518 is disposed spaced at equal distances between each other on a top surface of the printed wiring board 500.

Also, one end of the wiring pattern 511 is linked to the second through-hole 522 from an end of the row of through-holes 521 to 528; the other end is linked to the through-hole 531 at an end of the row of the other through-holes 531 to 538. One end of the wiring pattern 512 is linked to the third through-hole 523 from the end of the row of through-holes 521 to 528; the other end is linked to the through-hole 532 positioned at the second position from the end of the row of the other through-holes 531 to 538. One end of the wiring pattern 513 is linked to the fourth through-hole 524 from the end of the row of through-holes 521 to 528; the other end is linked to the through-hole 533 positioned at the third position from the end of the row of the other through-holes 531 to 538. One end of the wiring pattern 514 is linked to the fifth through-hole 525 from the end of the row of through-holes 521 to 528; the other end is linked to the through-hole 534 positioned at the fourth position from the end of the row of the other through-holes 531 to 538. One end of the wiring pattern 515 is linked to the sixth through-hole 526 from the end of the row of through-holes 521 to 528; the other end is linked to the through-hole 535 positioned at the fifth position from the end of the row of the other through-holes 531 to 538. One end of the wiring pattern 516 is linked to the seventh through-hole 527 from the end of the row of through-holes 521 to 528; the other end is linked to the through-hole 536 positioned at the sixth position from the end of the row of the other through-holes 531 to 538. One end of the wiring pattern 517 is linked to the eighth through-hole 528 from the end of the row of through-holes 521 to 528; the other end is linked to the through-hole 537 positioned at the seventh position from the end of the row of the other through-holes 531 to 538. An end of the wiring pattern 518 is disposed at a position of the same distance of the through-holes, from an end of the wiring pattern 517; the other end is linked to the through-hole 538 positioned at the eighth position from the end of the row of the other through-holes 531 to 538.

Still further, a power supply point 514a is set at a predetermined position on the fourth wiring pattern 514 from the end. An end of the power supply wiring pattern 541 is conductively connected to this power supply point. The through-hole 542 disposed on the other end of the power supply wiring pattern 541 is set near a narrow side of one of the printed wiring boards 500, as shown in the drawing.

A plurality of through-holes 621 to 628, and 631 to 638 is disposed on both sides in the width direction of the printed wiring board 300B, at predetermined spaces in a straight line parallel to the long sides. The positions of these through-holes 621 to 628, and 631 to 638 correspond to the through-holes 521 to 528, and 531 to 538 in the printed wiring board 500.

Furthermore, a plurality of linear printed wiring patterns (hereinafter referred to as wiring patterns) 611 to 618 is disposed spaced at equal distances between each other on a top surface of the printed wiring board 300B. A width of the length direction of the printed wiring board 300B of each wiring pattern 611 to 618 is set to the same width as the wiring patterns 511 to 518 on the printed wiring board 500; the length of the short side direction is set to the same as the wiring patterns 511 to 518 on the printed wiring board 500.

One end of the wiring pattern 611 is linked to the first through-hole 621 from the end of the row of through-holes 621 to 628; the other end is linked to the through-hole 631 positioned at the end of the row of the other through-holes 631 to 638. One end of the wiring pattern 612 is linked to the second through-hole 622 from the end of the row of through-holes 621 to 628; the other end is linked to the through-hole 632 positioned at the second position from the end of the row of the other through-holes 631 to 638. One end of the wiring pattern 613 is linked to the third through-hole 623 from the end of the row of through-holes 621 to 628; the other end is linked to the through-hole 633 positioned at the third position from the end of the row of the other through-holes 631 to 638. One end of the wiring pattern 614 is linked to the fourth through-hole 624 from the end of the row of through-holes 621 to 628; the other end is linked to the through-hole 634 positioned at the fourth position from the end of the row of the other through-holes 631 to 638. One end of the wiring pattern 615 is linked to the fifth through-hole 625 from the end of the row of through-holes 621 to 628; the other end is linked to the through-hole 635 positioned at the fifth position from the end of the row of the other through-holes 631 to 638. One end of the wiring pattern 616 is linked to the sixth through-hole 626 from the end of the row of through-holes 621 to 628; the other end is linked to the through-hole 636 positioned at the sixth position from the end of the row of the other through-holes 631 to 638. One end of the wiring pattern 617 is linked to the seventh through-hole 627 from the end of the row of through-holes 621 to 628; the other end is linked to the through-hole 637 positioned at the seventh position from the end of the row of the other through-holes 631 to 638. One end of the wiring pattern 618 is linked to the eighth through-hole 628 from the end of the row of through-holes 621 to 628; the other end is linked to the through-hole 638 positioned at the eighth position from the end of the row of the other through-holes 631 to 638.

Still further, a power supply point 615a is set at a predetermined position on the fifth wiring pattern 615 from the end. An end of the power supply wiring pattern 641 is conductively connected to this power supply point. The position of the power supply point 615a is set to a position that faces the power supply point 514a on the wiring pattern 514a on the printed wiring board 500.

The other end 642 of the power supply wiring pattern 641 is disposed to reach to the transmitter 440 formed on the printed wiring board 300B, as shown in the drawing.

The wiring patterns 511 to 518 on the printed wiring board 500, and the wiring patterns 611 to 618 on the printed wiring board 300B are conductively connected so that they form a helical shape in entirety, by the plurality of connection conductors 711 to 718, and 721 to 728. With this embodiment, cylindrically shaped conductors having a diameter of 0.75 mm, and a length of 8.0 mm are used as the connection conductors 711 to 718, and 721 to 728.

Specifically, each end 711a to 718a on the connection conductors 711 to 718 is inserted into and secured to the through-holes 521 to 528 in the printed wiring board 500, and each end 712a to 718a of the connection conductors 712 to 718 is conductively connected to an end of the wiring patterns 511 to 517. Also, each of the other ends 711b to 718b of the connection conductors 711 to 718 is inserted into and secured to the through-holes 621 to 628 in the printed wiring board 300B, and each of the other ends 711b to 718b on the connection conductors 711 to 718 is conductively connected to an end of the wiring patterns 611 to 617. Also, each end 721a to 728a of the connection conductors 721 to 728 is inserted into and secured to the through-holes 531 to 538 in the printed wiring board 500, and each end 721a to 728a on the connection conductors 721 to 728 is conductively connected to the other end of the wiring patterns 511 to 518. Also, each of the other ends 721b to 728b of the connection conductors 721 to 728 is inserted into and secured to the through-holes 631 to 638 in the printed wiring board 300B, and each of the other ends 721b to 728b of the connection conductors 721 to 728 is conductively connected to the other end of the wiring patterns 611 to 618.

Also, the through-hole 651 connected to the wiring pattern 652 is disposed on the printed wiring board 300B. The through-hole 651 is connected to the through-hole 542 disposed on the printed wiring board 500 by the connection conductor 731; an end 731a of the connection conductor 731 is conductively connected to the wiring pattern 541, and the other end 731b is conductively connected to the wiring pattern 652. Furthermore, this wiring pattern 652 is connected to the output of the transmitter 440.

According to the invention described above, an antenna element is formed by conductive wiring patterns 511 to 518, and 611 to 618 on two printed wiring boards 500 and 300B. A helically shaped antenna element is composed by these wiring patterns 511 to 518, and 611 to 618 being sequentially and alternately conductively connected by connection conductors 711 to 718, and 721 to 728. With this configuration, it is possible to manufacture an antenna with the dimension precision of the printed wiring patterns 511 to 518, and 611 to 618, and the dimension precision of the connection conductors 711 to 718 and 721 to 728 (for example, ±18 μm), and to easily manufacture a high-performance antenna. Furthermore, in addition to making mass production possible, this configuration also achieves a highly reliable electrical connection with printed wiring boards, and antennas that have excellent dimension precisions can be manufactured.

As shown in FIG. 16, when the tire-state detection device 10B configured as described above, is fitted to the rim 3, the case 100 is secured to the rim 3 top surface so that the bottom surface of the case body 120 faces the rim 3 surface. By securing the case 100 to the rim 3 in this way, the conductor pattern 320 that is set to the reference potential is disposed between the antenna 470 and top surface of the rim 3, so the conductor pattern (planar conductor) 320 becomes an interface between the antenna 470 and the rim 3 when the tire-state detection device 10B is fitted to the rim 3. For that reason, it is possible dramatically to reduce the effect that the metal constituting the rim 3 has on the antenna 470 compared to conventional devices.

Therefore, it is not necessary to create the antenna 470 that is equipped with optimum characteristics for each shape of the rim 3, and it is possible to use the same antenna 470 with any shape of the rim 3, so the manufacturing cost associated with each tire-state detection device 10B can be greatly reduced compared to conventional devices, and the tire-state detection device 10B can easily be mass produced.

Next, a fourth embodiment of the present invention will be explained.

Figure 17:
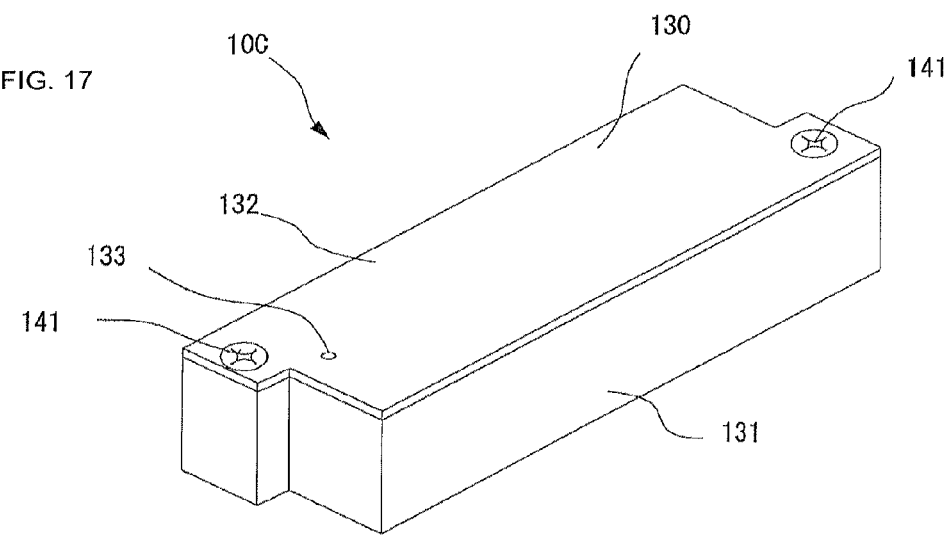
FIG. 17 is an external perspective view of the tire-state detection device according to a fourth embodiment of the present invention.
Figure 18:
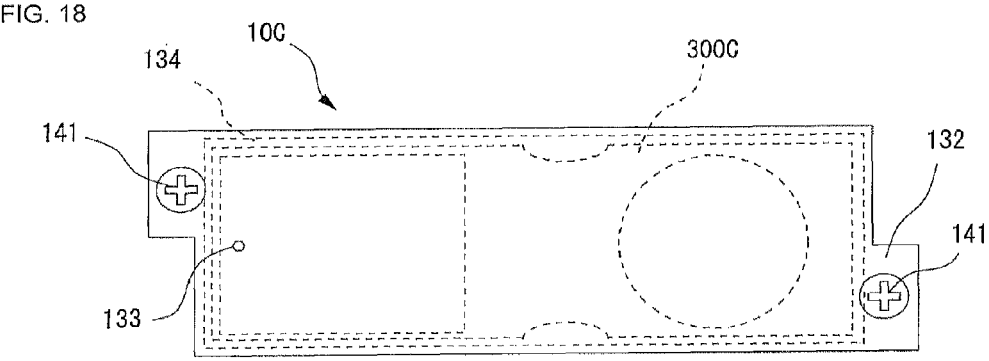
FIG. 18 is a plan view of the tire-state detection device according to the fourth embodiment of the present invention.
Figure 19:
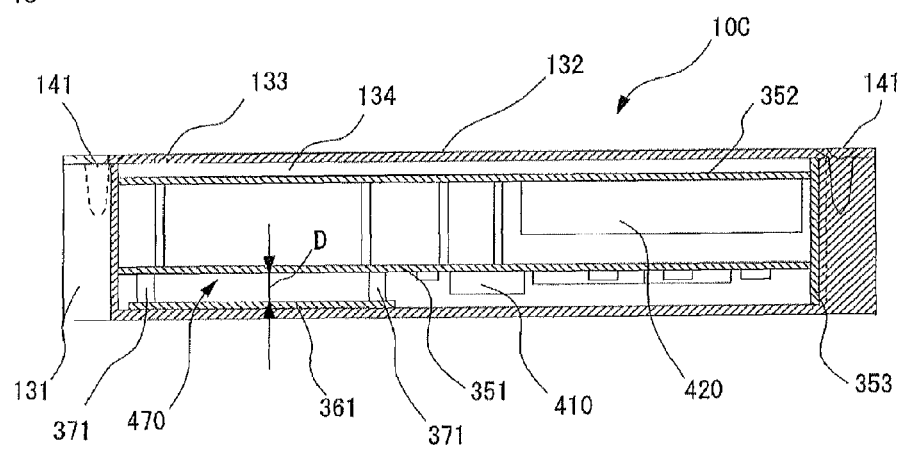
FIG. 19 is a lateral sectional view of the tire-state detection device according to the fourth embodiment of the present invention.
Figure 20:
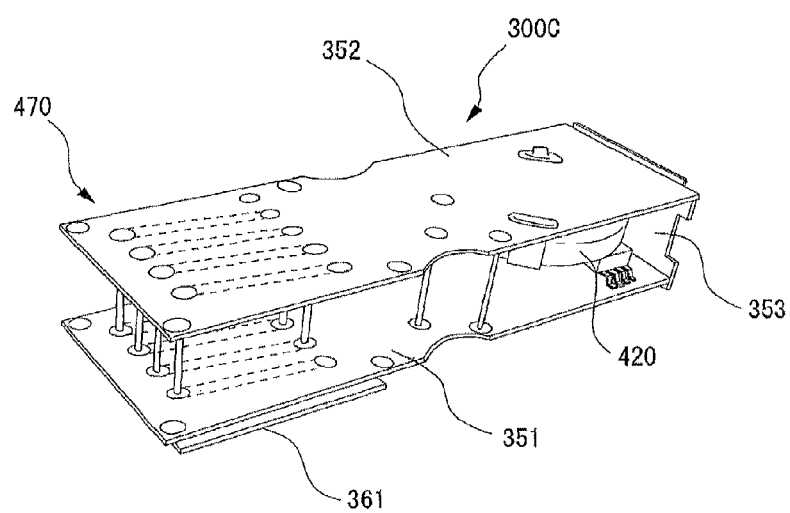
FIG. 20 is an external perspective view of a printed wiring board according to the fourth embodiment of the present invention.
Figure 21:
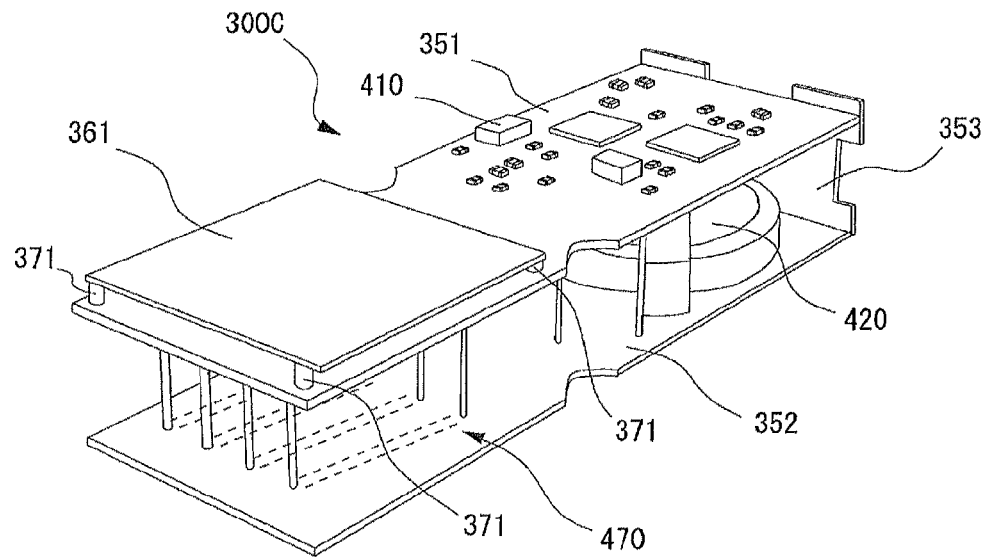
FIG. 21 is an external perspective view of the printed wiring board according to the fourth embodiment of the present invention.
Figure 22:
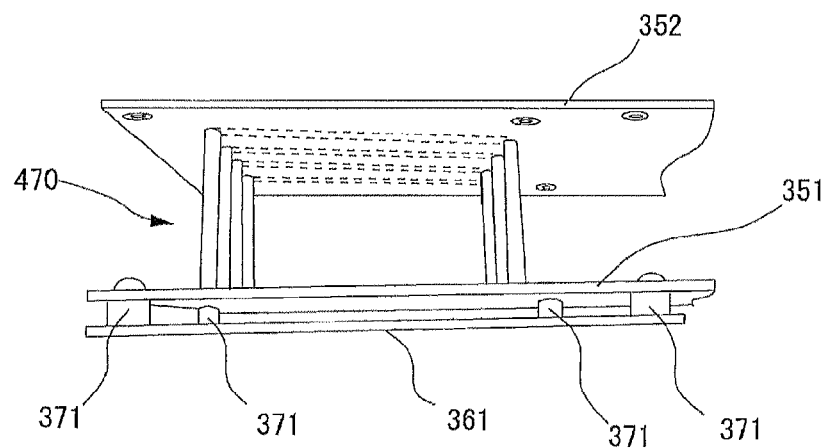
FIG. 22 is an external perspective view of an essential part of the printed wiring board according to the fourth embodiment of the present invention.

FIG. 17 an external perspective view of the tire-state detection device 10C according to a fourth embodiment of the present invention; FIG. 18 is a plan view of the tire-state detection device 10C according to the fourth embodiment of the present invention; FIG. 19 is a lateral sectional view of the tire-state detection device 10C according to the fourth embodiment of the present invention; FIGS. 20 and 21 are external perspective views of the printed wiring board 300C according to the fourth embodiment of the present invention; and FIG. 22 is an external perspective view of an essential part of the printed wiring board 300C according to the fourth embodiment of the present invention. The same symbols are used for the same components described in relation to the first to the third embodiments. Therefore, explanations of those symbols will be omitted. Also, points of difference between the first to the third embodiments and the fourth embodiment are that instead of the printed wiring board 300B used in the third embodiment, a printed wiring board 300C is used and provided with two substrates 351 and 352 disposed to have substantially the same shape, in parallel at a predetermined distance, and that a planar conductor plate 361 is equipped instead of the conductor pattern 320; these are housed in the case 130.

As shown in FIGS. 17 to 19, the case 130 has a substantially rectangular parallelepiped shape, and has projections used to screw-clamp both ends in the length direction. It is composed of a body 131 and a cover body 132. As shown in the FIG. 19, a storage space 134 is formed in the inside of the body 131 to house the printed wiring board 300C. An opening of the storage space 134 is closed by securing the cover body 132 to the body 131 using screws 141. Also, a ventilation hole 133 is formed in the cover body 132. Air is able to flow through the ventilation hole 133 from outside into the storage space 134 even when the cover body 132 is secured to the body 131.

As shown in FIGS. 20 to 22, the two, substantially rectangular printed wiring boards 351 and 352 of the printed wiring board 300C are disposed substantially parallel at a predetermined distance. These are secured together by the connection conductors 711 to 718 and 721 to 728, and 731 that constitute the antenna 470 and the printed wiring board 353 for connecting disposed therebetween. The antenna 470 is formed at one end of the length direction of the printed wiring board 300C; at the other end, are fitted electronic components that constitute an electronic circuit that includes the sensor 410 and the battery 420. The printed wiring board 353 for connection is soldered to each of the two printed wiring boards 351 and 352.

Also, in the same way as in the third embodiment, a plurality of through-holes 621 to 628, and 631 to 638 that compose the antenna 470 and a plurality of linear printed wiring patterns 611 to 618 are disposed on the printed wiring board 351. On the other printed wiring board 352, in the same way as in the third embodiment, a plurality of through-holes 521 to 528, and 531 to 538 that compose the antenna 470 and a plurality of linear printed wiring patterns 511 to 518 are disposed.

Figure 23:
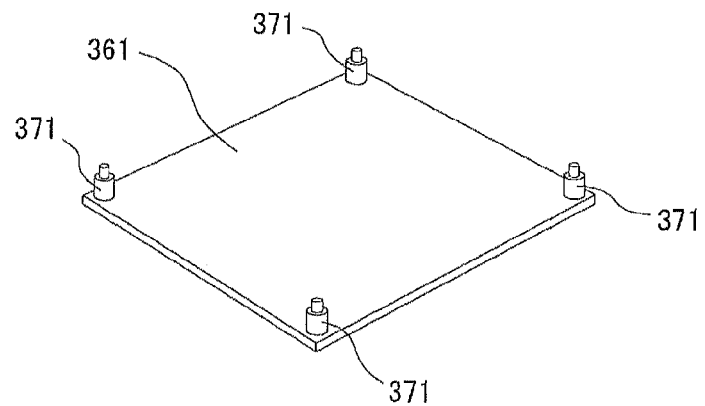
FIG. 23 is an external perspective view of a planar conductor plate and holder according to the fourth embodiment of the present invention.
Figure 24:
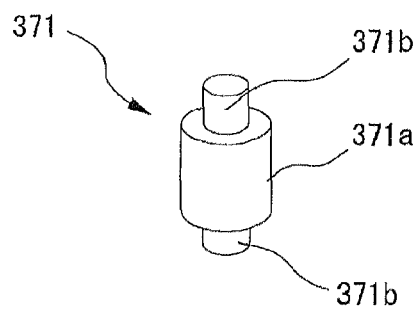
FIG. 24 is an external perspective view of the holder according to the fourth embodiment of the present invention.

Furthermore, a rectangular, planar conductor plate 361 is secured to the printed wiring board 300C by four holders 371. The planar conductor plate 361 is disposed at a position in the antenna 470 to be parallel to the printed wiring board 351 that is positioned at a bottom surface of the case body 131 when the printed wiring board 300C is housed in the case 130. The planar conductor plate 361 is secured by the holders 371 to maintain a predetermined space to the printed wiring board 351. The planar conductor plate 361 is disposed instead of the conductor pattern 320 described in relation to the third embodiment; it is electrically connected to predetermined conductor patterns (a conductor pattern connected to the negative electrode on the battery 420) of the printed wiring board 351 and is set to the reference potential. Also, as shown in FIG. 23 the holders 371 are secured in the four corners of the planar conductor plate 361. As shown in FIG. 24, the holders 371 are equipped at both ends of a cylindrically shaped body 371a with cylindrically shaped projections 371b having a smaller diameter than the body 371a.

Because the planar conductor plate 361 that is set to the reference potential is disposed at a predetermined distance from the printed wiring board 351 in this way, the planar conductor plate 361 that is set to the reference potential is arranged between the antenna 470 and the rim 3 by securing the case 130 to the rim 3 so that the bottom surface of the case body 131 touches the rim 3. Therefore, when the tire-state detection device 10C is fitted to the rim 3, the planar conductor plate 361 becomes an interface between the antenna 470 and the rim 3, allowing the the metal constituting the rim 3 to have dramatically less effect on the antenna 470 than experienced in conventional devices.

The antenna 470 has a resonance frequency of 315 MHz when the planar conductor plate 361 is fitted to the printed wiring board 351. The characteristic curve is represented by the curved line A in FIG. 25 in a Smith chart; the antenna impedance at 315 MHz is 50 ohms. The gap D between the printed wiring board 351 and the planar conductor plate 361 is set to 1.5 mm by the holders 371.

Figure 25:
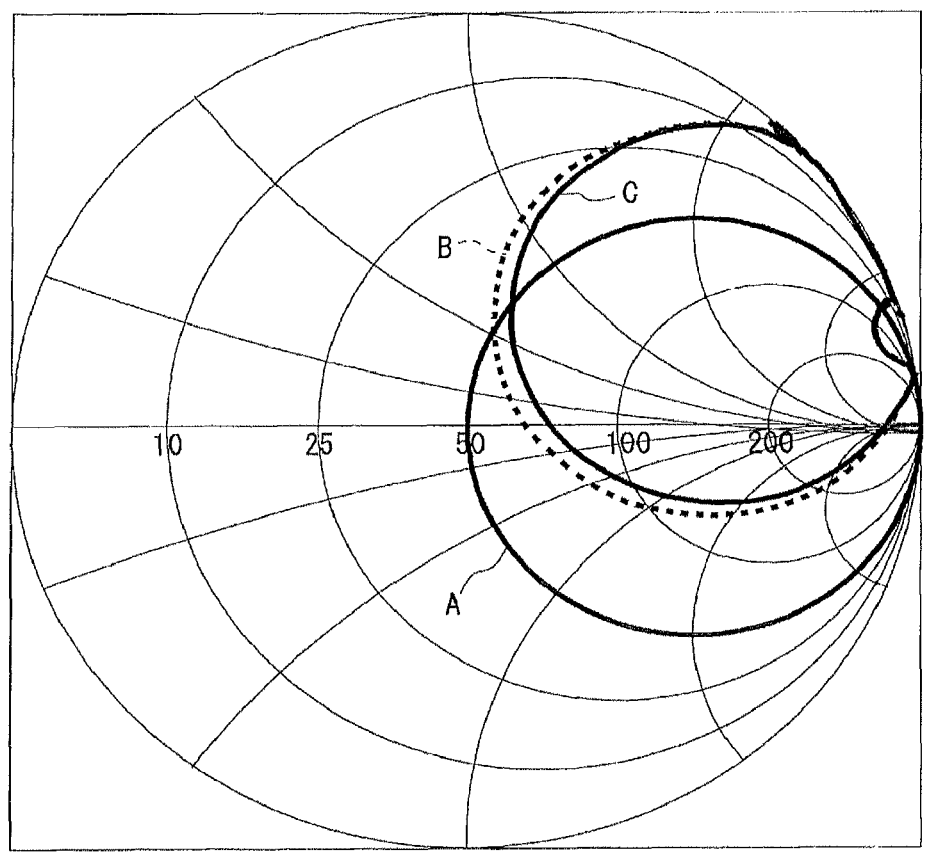
FIG. 25 is a Smith chart to explain characteristics of an antenna according to the fourth embodiment of the present invention.
Figure 26:
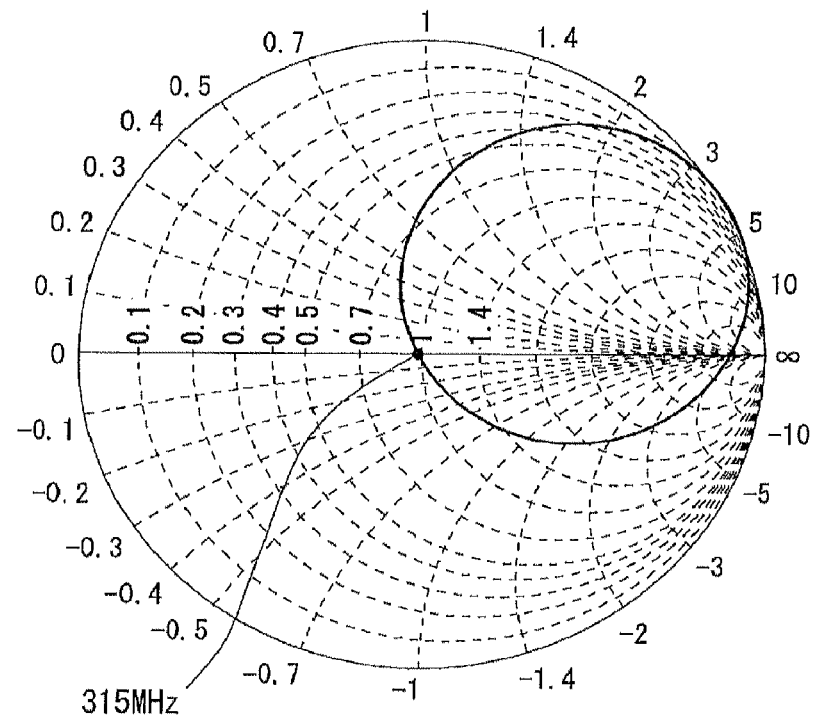
FIG. 26 is a Smith chart to explain characteristics of a normal antenna of the prior art.
Figure 27:
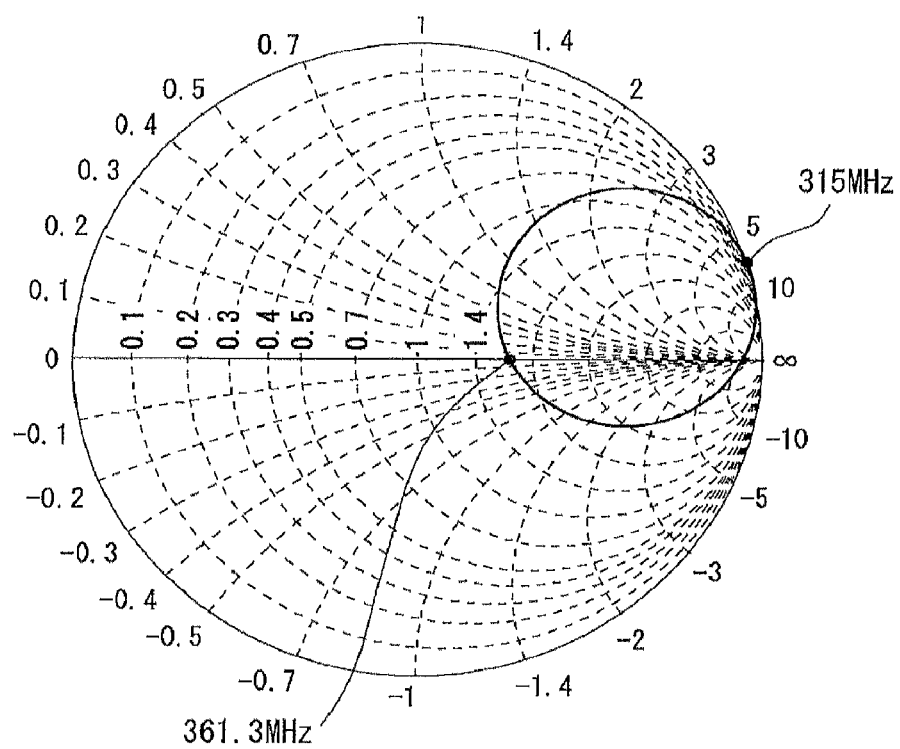
FIG. 27 is an explanation of the Smith chart symbols to explain fluctuations of characteristics of the antenna in the prior art.

Also, in a test example in FIG. 25, characteristic curves B and C are formed by varying the gap D between the printed wiring board 351 and the planar conductor plate 361. The characteristic curve B in FIG. 25 is formed with the gap D between the printed wiring board 351 and the planar conductor plate 361 is shifted 0.1 mm from 1.5 mm. At this time, the resonance frequency of the antenna 470 is 321 MHz, and its impedance is 66 ohms. The characteristic curve C in FIG. 25 is formed with the gap D between the printed wiring board 351 and the planar conductor plate 361 is shifted 0.15 mm from 1.5 mm. At this time, the resonance frequency of the antenna 470 is 310 MHz, and its impedance is 70 ohms.

In this way, the antenna 470 characteristics (frequency and impedance) vary according to the distance of the antenna 470 from the planar conductor plate 361, but no significant gain is obtained. In other words, if the distance between the antenna 470 and the planar conductor plate 361 is shifted even just a little (for example, 50 μm), the characters will vary greatly. This embodiment disposes holders 471 between the antenna 470 and the planar conductor plate 361 to maintain a constant distance D and overcome this issue. It is important that the gap D between the antenna 470 and the planar conductor plate 361 eliminates an effect of the dielectric body (it is best to have air without any loss in dielectric dissipation factor). Therefore, by disposing the planar conductor plate 361 to sandwich space and not to interfere with the antenna 470, the configuration eliminates loss of the dielectric dissipation factor of the antenna. This makes manufacturing easier, and attains stable antenna characteristics no matter what shape of metal is nearby, so the antenna gain can be improved.

Also, as the characteristics in FIG. 25 show, by varying the gap D between the printed wiring board 351 and the planar conductor plate 361, the frequency characteristics of the antenna 470 fluctuate, so for the holders 371, it is preferable to use materials that have low ratios of expansion and contraction caused by humidity and heat. For example, it is preferable to use Invar with a low ratio of expansion and contraction caused by humidity and temperature for the holders 371.

The invention claimed is:

1. A tire-state detection device, comprising:
   a sensor configured to detect a predetermined physical state of a tire;
   an antenna having a predetermined resonance frequency, the antenna circling around a predetermined axis circumference at a predetermined diameter and having a coiled shape extending in an axial direction;
   a detection circuit configured to transmit information regarding a result of a detection made by the sensor from the antenna as radio waves;
   a case configured to house the sensor, the antenna and the detection circuit, and configured to allow radio waves to pass therethrough, the case being further configured to fit on a rim in the tire when the tire-state detection device is to be used, a printed wiring board being provided inside the case, the printed wiring board being secured to the case and the antenna being securely provided to one surface of the printed wiring board;
   a planar conductor configured as being electrically insulated from the antenna at a position set a predetermined distance away from the antenna so as to form an interface between the antenna and the rim when the case is fitted to the rim, the planar conductor being set to a potential that is equivalent to a reference potential of the detection circuit, and the planar conductor being secured to the printed wiring board by a plurality of holders so that another surface of the printed wiring board and one surface of the planar conductor are parallel at a predetermined distance, and so that a predetermined space is formed between another surface of the printed wiring board and one surface of the planar conductor.

2. The tire-state detection device according to claim 1, wherein
   the antenna is provided on a surface of the printed wiring board that differs from a surface that faces the rim when the case is fitted to the rim; and
   the planar conductor is provided on a surface of the printed wiring board that faces the rim.

3. The tire-state detection device according to claim 2, wherein the planar conductor is 18 μm or more in thickness.

4. The tire-state detection device according to claim 2, wherein the axis of the coil-shaped antenna is arranged parallel to a surface of the planar conductor.

5. The tire-state detection device according to claim 1, wherein
   the planar conductor is provided on an inner surface of the case that faces the rim when the case is fitted to the rim.

6. The tire-state detection device according to claim 5, wherein the planar conductor is 18 μm or more in thickness.

7. The tire-state detection device according to claim 5, wherein the axis of the coil-shaped antenna is arranged parallel to a surface of the planar conductor.

8. The tire-state detection device according to claim 1, wherein the planar conductor is 18 μm or more in thickness.

9. The tire-state detection device according to claim 8, wherein the axis of the coil-shaped antenna is arranged parallel to a surface of the planar conductor.

10. The tire-state detection device according to claim 1, wherein the axis of the coil-shaped antenna is arranged parallel to a surface of the planar conductor.

* * * * *